US012811307B2

(12) United States Patent
Chou

(10) Patent No.: US 12,811,307 B2
(45) Date of Patent: Nov. 24, 2026

(54) ELECTRONIC DEVICE AND WAVE-ABSORBING STRUCTURAL COMPONENT

(71) Applicant: Getac Technology Corporation, New Taipei City (TW)

(72) Inventor: Po-Heng Chou, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 232 days.

(21) Appl. No.: 18/908,928

(22) Filed: Oct. 8, 2024

(65) Prior Publication Data

US 2025/0300361 A1 Sep. 25, 2025

(30) Foreign Application Priority Data

Mar. 22, 2024 (CN) ........................ 202410333959.0

(51) Int. Cl.
*H01Q 17/00* (2006.01)
*H01Q 1/48* (2006.01)

(52) U.S. Cl.
CPC ............... *H01Q 17/00* (2013.01); *H01Q 1/48* (2013.01)

(58) Field of Classification Search
None
See application file for complete search history.

(56) References Cited

U.S. PATENT DOCUMENTS

| | | | | |
|---|---|---|---|---|
| 8,040,284 | B2 | 10/2011 | Teng et al. | |
| 9,466,870 | B2 * | 10/2016 | Holt, Jr. | H01Q 1/526 |
| 9,595,762 | B2 * | 3/2017 | Huang | H01Q 9/0421 |
| 10,950,949 | B2 * | 3/2021 | Jeon | H01Q 1/523 |
| 12,463,321 | B2 * | 11/2025 | Kim | H01Q 1/2283 |
| 2006/0067070 | A1 * | 3/2006 | Otsuki | H05K 1/0218 257/E21.705 |
| 2011/0149544 | A1 * | 6/2011 | Khan | H01Q 1/526 29/601 |

FOREIGN PATENT DOCUMENTS

| | | | |
|---|---|---|---|
| CN | 203690497 | U | 7/2014 |
| TW | 201011982 | A | 3/2010 |
| TW | 1390943 | B | 3/2013 |
| TW | 202127976 | A | 7/2021 |
| TW | 202318717 | A | 5/2023 |

* cited by examiner

*Primary Examiner* — Bernarr E Gregory
(74) *Attorney, Agent, or Firm* — Cooper Legal Group, LLC

(57) ABSTRACT

The present disclosure provides a wave-absorbing structural component, which includes an absorber and a conductive material layer. The absorber is disposed on the metal surface, and an antenna is disposed on the side of the metal surface. The conductive material layer is disposed on the metal surface, the absorber is covered with the conductive material layer, and the conductive material layer is covered with the antenna ground piece of the antenna.

15 Claims, 3 Drawing Sheets

ELECTRONIC DEVICE AND WAVE-ABSORBING STRUCTURAL COMPONENT

RELATED APPLICATIONS

This application claims priority to China Patent Application No. 202410333959.0, filed Mar. 22, 2024, the entirety of which is herein incorporated by reference.

BACKGROUND

Field of Invention

The present invention relates to hardware devices, and more particularly, electronic devices and wave-absorbing structural components.

Description of Related Art

Generally, the frequency of a wireless radio frequency signal is equivalent to the frequency of radio waves and the frequency of alternating current carrying the radio frequency signal. In the wireless radio frequency field, noise in lower frequency bands can easily interfere with the performance of wireless wide area networks (WWAN). Although there are some noise suppression methods available, they can significantly reduce antenna efficiency.

In view of the foregoing, these noise suppression methods have some deficiencies that await further improvement. However, those skilled in the art sought vainly for a solution. Accordingly, there is an urgent need in the related field to effectively suppress noise without excessively affecting the antenna efficiency.

SUMMARY

In one or more various aspects, the present disclosure is directed to a speaker to solve the problems of the prior art.

Some embodiments of the present disclosure is related to a wave-absorbing structural component includes an absorber and a conductive material layer. The absorber is disposed on a metal surface, where an antenna is disposed on a side of the metal surface. The conductive material layer is disposed on the metal surface, where the absorber is covered with the conductive material layer, and the conductive material layer is covered with an antenna ground piece of the antenna.

In some embodiments of the present disclosure, a gap is disposed between the conductive material layer and the antenna.

In some embodiments of the present disclosure, the conductive material layer includes a conductive top cover, a first conductive side part and a second conductive side part. The conductive top cover is disposed on the absorber, and the absorber is disposed between the conductive top cover and the metal surface. The first conductive side part is physically connected to a side of the conductive top cover, and the gap is disposed between the first conductive side part and the antenna. The second conductive side part is physically connected to another side of the conductive top cover, where the first conductive side part and the second conductive side part are disposed on two opposite sides of the absorber respectively.

Some embodiments of the present disclosure is related to an electronic device includes a metal surface, an absorber, a conductive material layer, an antenna and an antenna ground piece. The absorber is disposed on the metal surface. The conductive material layer is disposed on the metal surface, and the absorber is covered with the conductive material layer. The antenna is disposed on a side of the metal surface. The antenna ground piece is electrically connected to the antenna, the antenna ground piece is disposed on the metal surface, and the conductive material layer is covered with an antenna ground piece.

In some embodiments of the present disclosure, the conductive material layer includes a first conductive side part, a second conductive side part and a conductive top cover. A gap is disposed between the first conductive side part and the antenna. The second conductive side part and the first conductive side part are disposed on two opposite sides of the absorber. The conductive top cover is disposed on the absorber, where the absorber is disposed between the conductive top cover and the metal surface, and two opposite sides of the conductive top cover are physically connected to the first conductive side part and the second conductive side part respectively.

In some embodiments of the present disclosure, the antenna ground piece includes a ground plate top part and a ground plate side part. A side of the ground plate top part is electrically connected to the antenna, and the conductive top cover is covered with the ground plate top part. The ground plate side part is physically connected to another side of the ground plate top part, where the second conductive side part is covered with the ground plate side part.

In some embodiments of the present disclosure, a length of the ground plate top part along a first direction is greater than or equal to a length of the conductive top cover along the first direction, and the length of the conductive top cover along the first direction is greater than a length of the absorber along the first direction.

In some embodiments of the present disclosure, a thickness of the ground plate top part along a second direction ranges from 0.1 to 0.15 mm, and the second direction is perpendicular to the first direction.

In some embodiments of the present disclosure, a thickness of the conductive top cover along a second direction ranges from 0.03 to 0.13 mm, and the second direction is perpendicular to the first direction.

In some embodiments of the present disclosure, a thickness of the absorber along a second direction ranges from 0.05 to 3 mm, and the second direction is perpendicular to the first direction.

In some embodiments of the present disclosure, a length of the ground plate top part along a first direction is greater than or equal to a length of the conductive top cover along the first direction.

In some embodiments of the present disclosure, a thickness of the ground plate top part along a second direction ranges from 0.1 to 0.15 mm, and the second direction is perpendicular to the first direction.

In some embodiments of the present disclosure, a thickness of the conductive top cover along a second direction ranges from 0.03 to 0.13 mm, and the second direction is perpendicular to the first direction.

In some embodiments of the present disclosure, a length of the conductive top cover along the first direction is greater than a length of the absorber along the first direction.

In some embodiments of the present disclosure, a thickness of the absorber along a second direction ranges from 0.05 to 3 mm, and the second direction is perpendicular to the first direction.

Technical advantages generally achieve by embodiments of the present disclosure. The electronic device and its wave-absorbing structural component of the present disclosure can achieve the noise suppression effect and can reduce the adverse impact on antenna efficiency.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
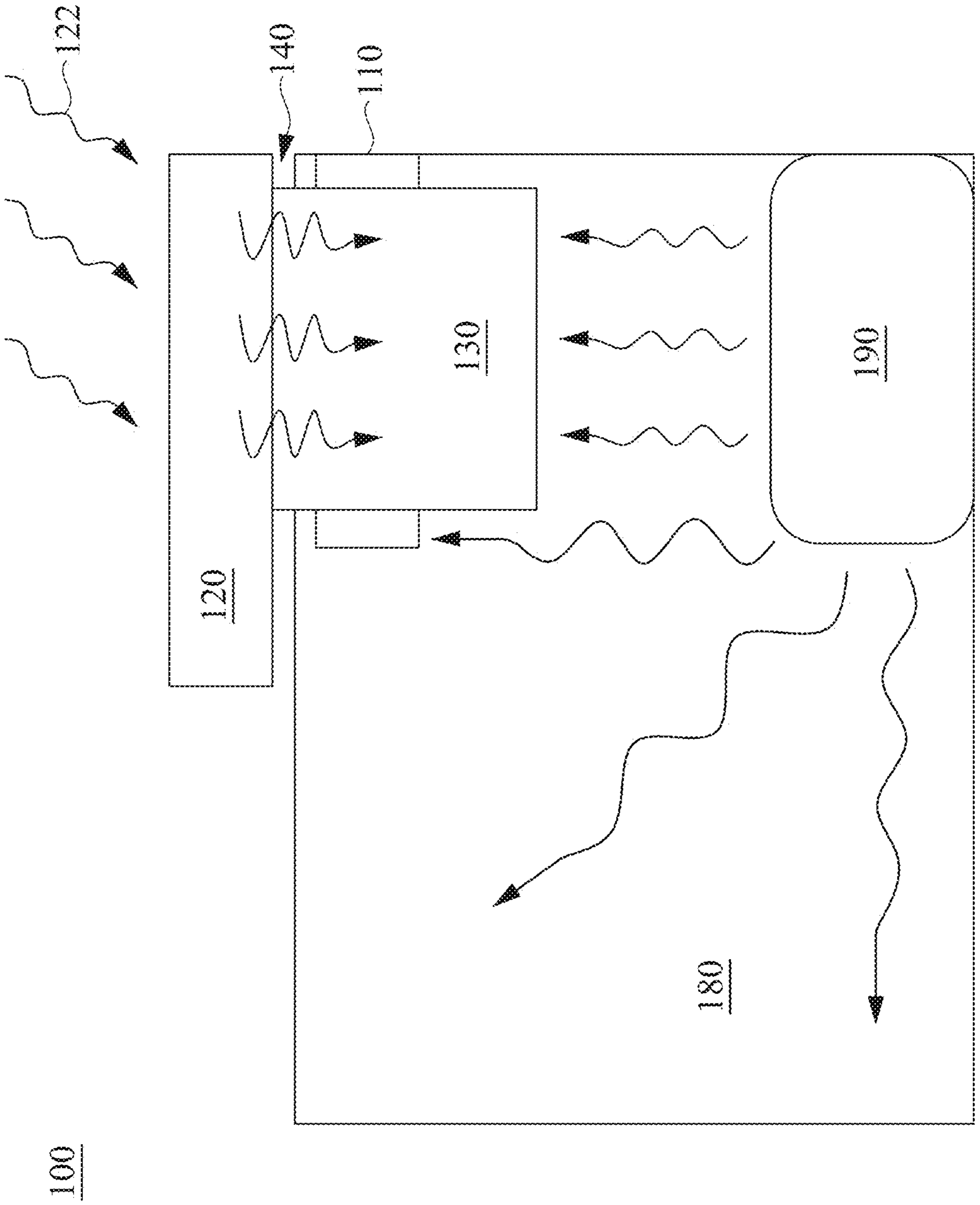
FIG. 1 is a plan view of an electronic device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
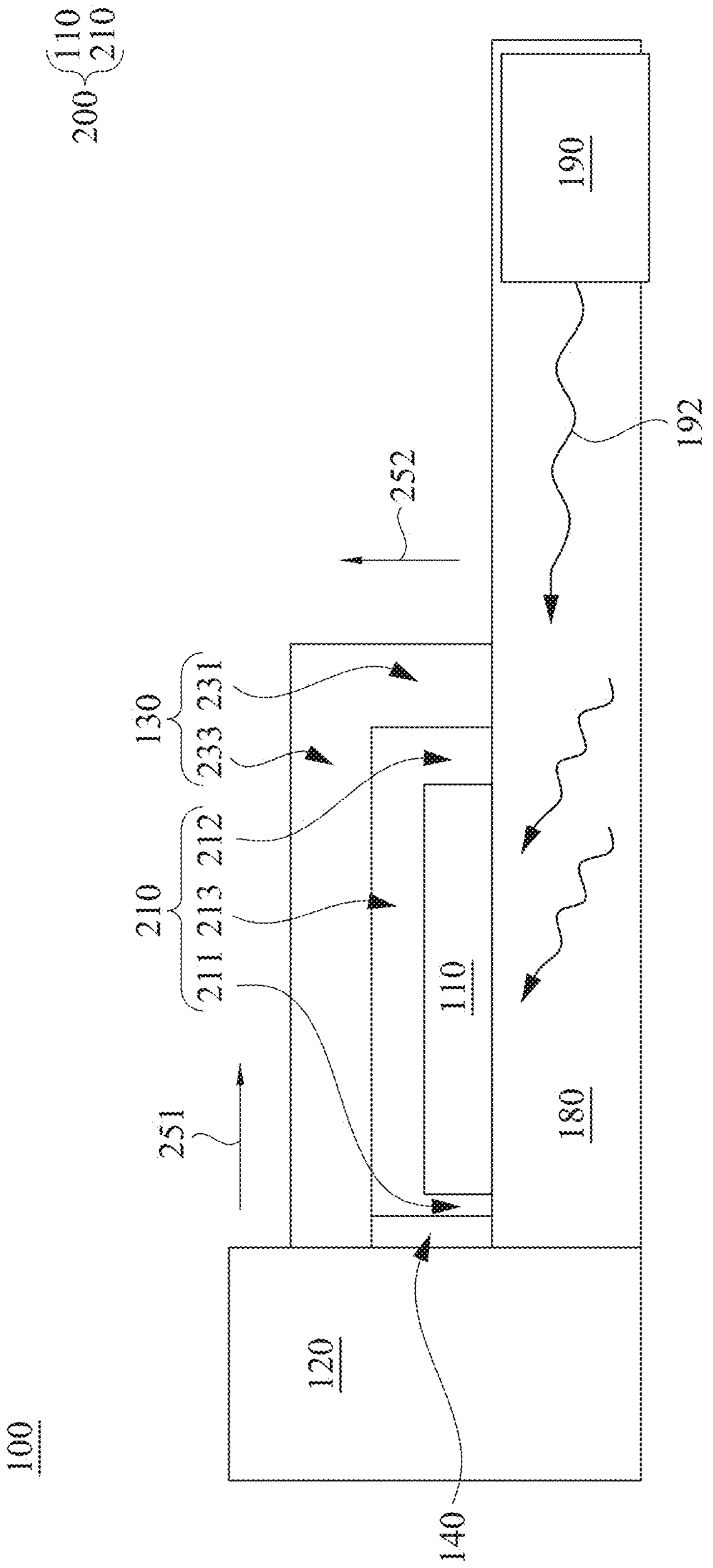
FIG. 2 is a cross-sectional view of the electronic device according to some embodiments of the present disclosure.

Referring to FIG. 1 and FIG. 2, in one aspect, the present disclosure is directed to an electronic device 100. This passive radiator module can be applied to various electronic products with wireless communication functions and may be applicable or readily adaptable to all technologies. Accordingly, the electronic device 100 has advantages. Herewith the electronic device 100 is described below with FIG. 1 and FIG. 2.

The subject disclosure provides the electronic device 100 in accordance with the subject technology. Various aspects of the present technology are described with reference to FIG. 1 and FIG. 2. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Referring to FIG. 1, FIG. 1 is a plan view of an electronic device according to some embodiments of the present disclosure. In practice, for example, the electronic device 100 can be applied to a laptop, a screen, a mobile phone, a tablet or another electronic product.

As shown in FIG. 1, the electronic device 100 includes a metal surface 180, an absorber 110, an antenna 120 and an antenna ground piece 130. In practice, for example, the antenna 120 can be an antenna suitable for the wireless wide area network or another antenna system, the antenna ground piece 130 can be a grounded conductive metal piece (such as a grounded copper or another metal part), and the metal surface 180 can be a light guide plate or another metal plates. The absorber 110 can be an absorbing component, and the absorbing component can be an absorbing plate, a ferrite, a metal ultra-fine powder coating component, a metal oxide magnetic ultra-fine powder coating component or a ceramic absorbing coating component, but the present disclosure is not limited thereto.

In some embodiments, the absorber 110 is disposed on the metal surface 180, the antenna 120 is disposed on the side of the metal surface 180, the antenna ground piece 130 is disposed on the metal surface 180, and the antenna ground piece 130 is electrically connected to the antenna 120.

It should be understood that, in this disclosure, the description of "electrical connection" can generally refer to one component being indirectly electrically coupled to another component through other components, or one component being directly electrically connected to another component without going through another component. For example, the antenna ground piece 130 can be directly electrically connected to the antenna 120, or the antenna ground piece 130 can be indirectly connected to the antenna 120 through one or more other components.

In practice, the metal surface 180 of the electronic device 100 can inevitably have a noise source 190 of emitting noise 192. In order to suppress the noise 192, in some embodiments of the present disclosure, the absorber 110 is provided under the antenna ground piece 130. Through the absorber 110 having the absorption function for radio waves, the noise 192 coupled from the antenna ground piece 130 is absorbed and converted into other energy, such as heat energy, thereby suppressing the noise of the antenna 120 (such as the noise of the lower frequency band of the wireless wide area network), and improving the performance of the antenna 120 for receiving the RF signal 122.

Furthermore, in order to prevent the antenna efficiency of the antenna 120 from being absorbed by the absorber 110, in some embodiments of the present disclosure, a conductive material layer is disposed between the antenna ground piece 130 and the absorber 110. The conductive material layer is disposed on the metal surface 180, the conductive material layer is covered with the antenna ground piece 130, and the absorber 110 is covered with the conductive material layer. In this way, the conductive material layer blocks a path that the antenna efficiency of the antenna 120 is absorbed by the absorber 110 through the antenna ground piece 130, so that the electronic device 100 can not only achieve the noise suppression effect, but can also reduce the adverse impact on antenna efficiency.

In order to provide a more detailed explanation of the conductive material layer, refer to FIG. 1 and FIG. 2 at the same time. FIG. 2 is a cross-sectional view of the electronic device according to some embodiments of the present disclosure. As shown in FIG. 2, the electronic device 100 includes a wave-absorbing structural component 200 that can maintain antenna efficiency.

In some embodiments of the present embodiments, the wave-absorbing structural component 200 as shown in FIG. 2 includes an absorber 110 and a conductive material layer 210. In practice, for example, the conductive material layer 210 can be a metal layer, such as copper foil or another component.

In some embodiments, the absorber 110 is disposed on the metal surface 180, and the antenna 120 is disposed on the side of metal surface 180. The conductive material layer 210 is disposed on the metal surface 180, and the absorber 110 is covered with the conductive material layer 210, and the conductive material layer 210 is covered with the antenna ground piece 130 of the antenna 120. The absorber 110 is covered with the conductive material layer 210, so as to effectively block a path that the antenna efficiency of the antenna 120 is absorbed by the absorber 110 through the antenna ground piece 130, so that the wave-absorbing structural component 200 can not only achieve the noise suppression effect, but also can reduce the adverse impact on antenna efficiency.

In some embodiments of the present disclose, a gap 140 is disposed between the conductive material layer 210 and the antenna 120. Through the setting of gap 140, the noise suppression effect is enhanced while the antenna efficiency is maintained.

In order to further elaborate on the conductive material layer 210, please continue to refer to FIG. 2. In some embodiments of the present disclosure, the conductive material layer 210 includes a conductive top cover 213, a first conductive side part 211, and a second conductive side part 212. In practice, for example, the conductive top cover 213, the first conductive side part 211, and the second conductive side part 212 can be made out of one piece, so as to facilitate production.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

The conductive top cover 213 is disposed on the absorber 110, and the absorber 110 is disposed between the conductive top cover 213 and the metal surface 180. The first conductive side part 211 is physically connected to a side of the conductive top cover 213, and the gap 140 is disposed between the first conductive side part 211 and the antenna 120. The second conductive side part 212 is physically connected to another side of the conductive top cover 213, where the first conductive side part 211 and the second conductive side part 212 are respectively disposed on two opposite sides of the absorber 110. The absorber 110 is completely covered with the conductive top cover 213, the first conductive side part 211 and the second conductive side part 212, so as to effectively block a path that the antenna efficiency of the antenna 120 is absorbed by the absorber 110 through the antenna ground piece 130, so that the conductive material layer 210 can reduce the adverse effect on antenna efficiency by the absorber 110.

In order to further elaborate on the overall architecture of the electronic device 100, please continue to refer to FIG. 2. In some embodiments of the disclosure, the electronic device 100 includes the metal surface 180, the absorber 110, the conductive material layer 210, the antenna 120 and the antenna ground piece 130.

The absorber 110 is disposed on the metal surface 180, the conductive material layer 210 is disposed on the metal surface 180, and the absorber 110 is covered with the conductive material layer 210. In practice, for example, the absorber 110 can be partially or completely covered with the conductive material layer 210. The antenna 120 is disposed on a side of the metal surface 180, and the antenna ground piece 130 is electrically connected to the antenna 120. The antenna ground piece 130 is disposed on the metal surface 180, and the conductive material layer 210 is covered with the antenna ground piece 130. In practice, for example, the conductive material layer 210 can be partially or completely covered with the antenna ground piece 130, or the antenna ground piece 130 can be larger than the conductive material layer 210. In this way, the conductive material layer 210 effectively blocks a path that the antenna efficiency of the antenna 120 is absorbed by the absorber 110 through the antenna ground piece 130, so that the absorber 110 can achieve the noise suppression effect, and the conductive material layer 210 can also reduce the adverse effect on antenna efficiency by the absorber 110.

Regarding the conductive material layer 210, in some embodiments of the present disclosure, the conductive material layer 210 includes a first conductive side part 211, a second conductive side part 212 and a conductive top cover 213.

In some embodiments, the gap 140 is disposed between the first conductive side part 211 and the antenna 120, and the second conductive side part 212 and the first conductive side part 211 are respectively disposed on two opposite sides of the absorber 110. In some embodiments, the conductive top cover 213 is disposed on the absorber 110, and the absorber 110 is disposed between the conductive top cover 213 and the metal surface 180. Two opposite sides of the conductive top cover 213 are physically connected to the first conductive side part 211 and the second conductive side part 212 respectively.

Regarding the antenna ground piece 130, in some embodiments of the present disclosure, the antenna ground piece 130 includes a ground plate top part 233 and a ground plate side part 231. In practice, for example, the ground plate top part 233 and the ground plate side part 231 can be made out of one piece, so as to facilitate production.

In some embodiments, one side of ground plate top part 233 is electrically connected to the antenna 120, the conductive top cover 213 is covered with the ground plate top part 233, the ground plate side part 231 is physically connected to another side of ground plate top part 233, and the second conductive side part 212 is covered with the ground plate side part 231.

Regarding the size relationship among the ground plate top part 233, the conductive top cover 213 and the absorber 110, in some embodiments of the present disclosure, the length of the ground plate top part 233 along the first direction 251 is greater than or equal to the length of the conductive top cover 213 along the first direction 251, The length of the conductive top cover 213 along the first direction 251 is greater than the length of the absorber 110 along the first direction 251, thereby enhancing the noise suppression effect and reducing that the antenna efficiency is affected adversely by the absorber 110. In practice, for example, the first direction 251 is a horizontal direction that the ground plate top part 233 is extended from the antenna 120 to the ground plate side part 231.

In some embodiments of the present disclosure, the thickness of the ground plate top part 233 along the second direction 252 ranges from about 0.1 to 0.15 mm, and the second direction 252 is perpendicular to the first direction 251. For example, the second direction 252 is a normal vector direction of metal surface 180. In practice, according to experimental data, compared with other sizes, by setting the ground plate top part 233 with a thickness in the range of approximately 0.1 to 0.15 mm, the grounding capability of the antenna ground piece 130 can be effectively improved.

In some embodiments of the present disclosure, the thickness of the conductive top cover 213 along the second direction 252 ranges from about 0.03 to 0.13 mm, and the second direction 252 is perpendicular to the first direction 251. In practice, according to experimental data, compared with other sizes, by setting the conductive top cover 213 with the thickness in the range of approximately 0.03 to 0.13 mm, the conductive material layer 210 can effectively reduce the adverse impact on antenna efficiency by the absorber 110.

In some embodiments of the present disclosure, the thickness of the absorber 110 along the second direction 252 ranges from about 0.05 to 3 mm, and the second direction 252 is perpendicular to the first direction 251. In practice, according to experimental data, compared with other sizes, the ability of absorber 110 to suppress noise can be effectively improved by setting the thickness of absorber 110 in the range of approximately 0.05 to 3 mm.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

Figure 3:
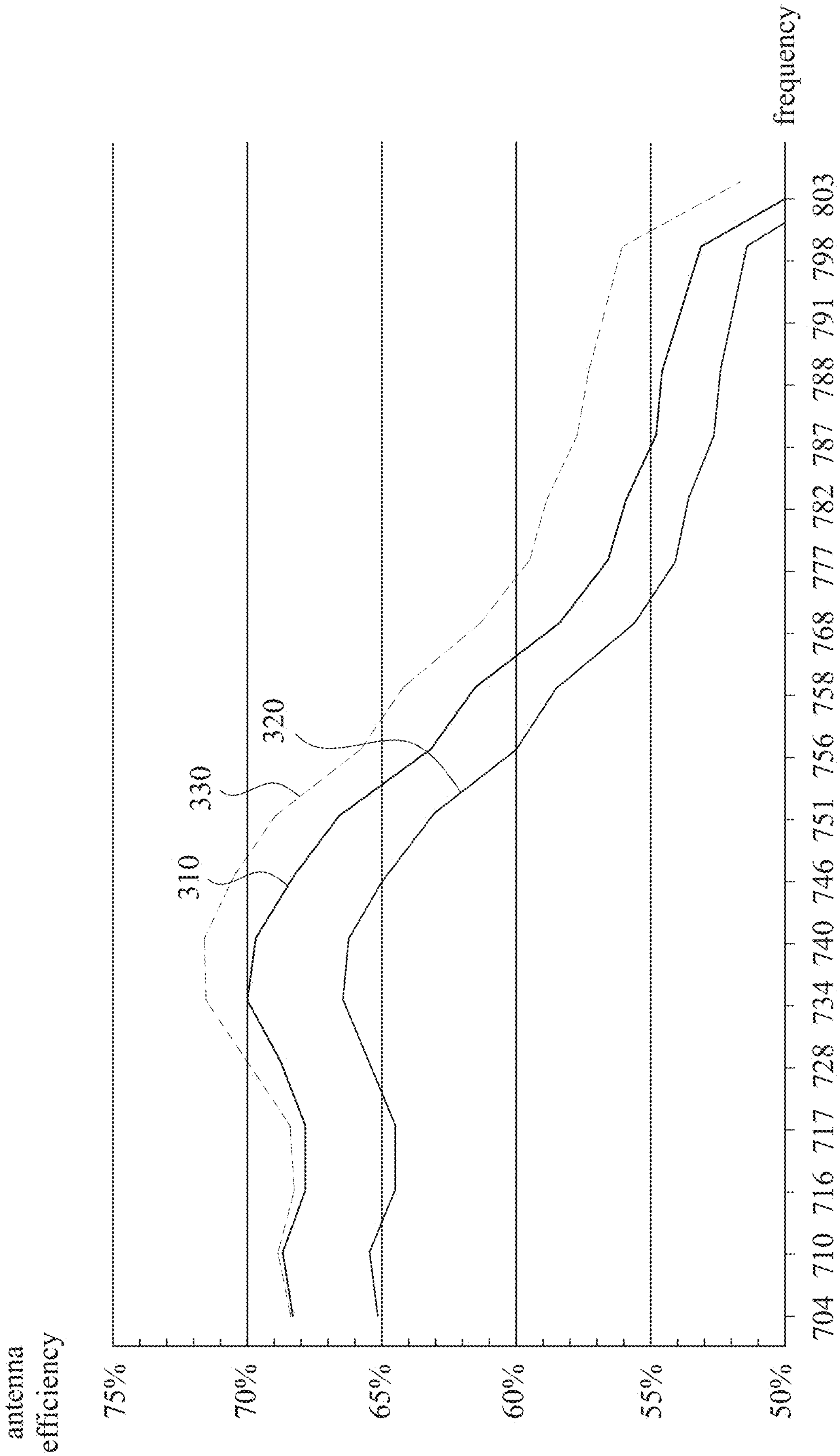
FIG. 3 is a chart of the antenna efficiency according to some embodiments of the present disclosure.

FIG. 3 is a chart of the antenna efficiency according to some embodiments of the present disclosure. Refer to FIG. 1 to FIG. 3 at the same time. The curve 310 of the electronic device 100 of the present disclosure reflects good antenna efficiency. The absorber 110 can achieve the noise suppression effect, and the low noise in the low frequency band is only about −92 dBm. The conductive material layer 210 can also reduce the adverse effect on antenna efficiency by the absorber 110.

When the absorber 110 and the conductive material layer 210 are removed from the electronic device 100, the antenna efficiency presented by the curve 330 is slightly higher than the antenna efficiency of the curve 310. However, since the absorber 110 is omitted, the noise cannot be suppressed, resulting in high noise in the lower frequency band (such as: approximately −89 dBm), and this high noise can easily interfere with the performance of wireless wide area networks (WWAN).

When the conductive material layer 210 is removed from the electronic device 100 but the absorber 110 is retained, the antenna efficiency presented by the curve 320 is the lowest. Since the conductive material layer 210 is omitted, the antenna efficiency is absorbed by the absorber 110. Although the absorber 110 improves the receiving performance, it seriously affects the RF signal transmitted by the antenna 120.

In view of the above, technical advantages are generally achieved by embodiments of the present disclosure. The electronic device 100 and its wave-absorbing structural component 200 of the present disclosure can achieve the noise suppression effect and reduce the adverse impact on antenna efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wave-absorbing structural component, comprising:

an absorber disposed on a metal surface, wherein an antenna is disposed on a side of the metal surface; and a conductive material layer disposed on the metal surface, wherein the absorber is covered with the conductive material layer, and the conductive material layer is covered with an antenna ground piece of the antenna.

2. The wave-absorbing structural component of claim 1, wherein a gap is disposed between the conductive material layer and the antenna.

3. The wave-absorbing structural component of claim 2, wherein the conductive material layer comprises:

a conductive top cover disposed on the absorber, and the absorber is disposed between the conductive top cover and the metal surface;

a first conductive side part physically connected to a side of the conductive top cover, and the gap is disposed between the first conductive side part and the antenna; and a second conductive side part physically connected to another side of the conductive top cover, wherein the first conductive side part and the second conductive side part are disposed on two opposite sides of the absorber respectively.

4. An electronic device, comprising:

a metal surface;

an absorber disposed on the metal surface;

a conductive material layer disposed on the metal surface, and the absorber covered with the conductive material layer;

an antenna disposed on a side of the metal surface; and an antenna ground piece electrically connected to the antenna, the antenna ground piece disposed on the metal surface, and the conductive material layer covered with the antenna ground piece.

5. The electronic device of claim 4, wherein the conductive material layer comprises:

a first conductive side part, wherein a gap is disposed between the first conductive side part and the antenna;

a second conductive side part, wherein the second conductive side part and the first conductive side part are disposed on two opposite sides of the absorber; and a conductive top cover disposed on the absorber, wherein the absorber is disposed between the conductive top cover and the metal surface, and two opposite sides of the conductive top cover are physically connected to the first conductive side part and the second conductive side part respectively.

6. The electronic device of claim 5, wherein the antenna ground piece comprises:

a ground plate top part, wherein a side of the ground plate top part is electrically connected to the antenna, and the conductive top cover is covered with the ground plate top part; and a ground plate side part physically connected to another side of the ground plate top part, wherein the second conductive side part is covered with the ground plate side part.

7. The electronic device of claim 6, wherein a length of the ground plate top part along a first direction is greater than or equal to a length of the conductive top cover along the first direction, and the length of the conductive top cover along the first direction is greater than a length of the absorber along the first direction.

8. The electronic device of claim 7, wherein a thickness of the ground plate top part along a second direction ranges from 0.1 to 0.15 mm, and the second direction is perpendicular to the first direction.

9. The electronic device of claim 7, wherein a thickness of the conductive top cover along a second direction ranges from 0.03 to 0.13 mm, and the second direction is perpendicular to the first direction.

10. The electronic device of claim 7, wherein a thickness of the absorber along a second direction ranges from 0.05 to 3 mm, and the second direction is perpendicular to the first direction.

11. The electronic device of claim 6, wherein a length of the ground plate top part along a first direction is greater than or equal to a length of the conductive top cover along the first direction.

12. The electronic device of claim 11, wherein a thickness of the ground plate top part along a second direction ranges from 0.1 to 0.15 mm, and the second direction is perpendicular to the first direction.

13. The electronic device of claim 11, wherein a thickness of the conductive top cover along a second direction ranges from 0.03 to 0.13 mm, and the second direction is perpendicular to the first direction.

14. The electronic device of claim 5, wherein a length of the conductive top cover along a first direction is greater than a length of the absorber along the first direction.

15. The electronic device of claim 14, wherein a thickness of the absorber along a second direction ranges from 0.05 to 3 mm, and the second direction is perpendicular to the first direction.

* * * * *